US012159511B2

(12) United States Patent
Chim

(10) Patent No.: US 12,159,511 B2
(45) Date of Patent: Dec. 3, 2024

(54) GAMING METHOD AND A GAMING SYSTEM

(71) Applicant: Aristocrat Technologies Australia Pty Limited, North Ryde (AU)

(72) Inventor: Chi We Chim, Castle Hill (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/316,833

(22) Filed: May 12, 2023

(65) Prior Publication Data

US 2023/0282066 A1 Sep. 7, 2023

Related U.S. Application Data

(63) Continuation of application No. 17/534,152, filed on Nov. 23, 2021, now Pat. No. 11,688,240, which is a (Continued)

(30) Foreign Application Priority Data

May 23, 2008 (AU) ................................ 2008902585

(51) Int. Cl.
*G07F 17/32* (2006.01)

(52) U.S. Cl.
CPC ...... *G07F 17/3258* (2013.01); *G07F 17/3209* (2013.01); *G07F 17/3211* (2013.01); (Continued)

(58) Field of Classification Search
CPC .. G07F 17/32; G07F 17/3209; G07F 17/3211; G07F 17/3225; G07F 17/3246; (Continued)

(56) References Cited

U.S. PATENT DOCUMENTS 3,269,503 A 8/1966 Foster
4,948,134 A 8/1990 Suttle
(Continued)

FOREIGN PATENT DOCUMENTS

CA 1334983 C 3/1995
CA 2227649 A1 8/1998
(Continued)

OTHER PUBLICATIONS

Richard D. Harroch et al., "Poker for Dummies", Wiley Publishers, entire book, 2007.
(Continued)

*Primary Examiner* — Milap Shah
(74) *Attorney, Agent, or Firm* — Armstrong Teasdale LLP

(57) ABSTRACT

An electronic gaming machine includes a game controller configured to select a first plurality of card symbols to form a player hand for a player, wherein the first plurality of card symbols include a plurality of hole cards dealt only to the player and at least one community card. The game controller is also configured to select a second plurality of card symbols to form a jackpot hand, and determine whether at least one card symbol of the first plurality of card symbols matches at least one card symbol of the second plurality of card symbols. The game controller is also configured to adjust, based on the determining, a credit balance of the player by a value associated with a jackpot award based upon a number of hole cards in the player hand that match card symbols in the jackpot hand.

17 Claims, 7 Drawing Sheets

Related U.S. Application Data continuation of application No. 16/866,216, filed on May 4, 2020, now Pat. No. 11,195,376, which is a continuation of application No. 16/195,466, filed on Nov. 19, 2018, now Pat. No. 10,657,769, which is a continuation of application No. 15/257,151, filed on Sep. 6, 2016, now Pat. No. 10,147,271, which is a continuation of application No. 13/434,201, filed on Mar. 29, 2012, now Pat. No. 9,437,082, which is a continuation of application No. 12/468,518, filed on May 19, 2009, now abandoned.

(52) U.S. Cl.
CPC ...... *G07F 17/3225* (2013.01); *G07F 17/3246* (2013.01); *G07F 17/3251* (2013.01); *G07F 17/3293* (2013.01)

(58) Field of Classification Search
CPC ............. G07F 17/3251; G07F 17/3258; G07F 17/326; G07F 17/3262; G07F 17/3293; G07F 17/34; A63F 3/00157; A63F 1/00; A63F 2003/0057
USPC ...................................... 463/11–13; 273/292
See application file for complete search history.

(56) References Cited

U.S. PATENT DOCUMENTS

| | | | | |
|---|---|---|---|---|
| 5,019,973 | A | 5/1991 | Wilcox | |
| 5,042,818 | A | 8/1991 | Weingardt | |
| 5,224,706 | A | 7/1993 | Bridgeman | |
| 5,275,400 | A | 1/1994 | Weingardt | |
| 5,377,973 | A | 1/1995 | Jones | |
| 5,486,005 | A | 1/1996 | Neal | |
| 5,489,101 | A | 2/1996 | Moody | |
| 5,531,448 | A | 7/1996 | Moody | |
| 5,584,486 | A | 12/1996 | Franklin | |
| 5,597,162 | A | 1/1997 | Franklin | |
| 5,639,092 | A | 6/1997 | Macaisa | |
| 5,664,781 | A | 9/1997 | Feola | |
| 5,678,821 | A | 10/1997 | Hedman | |
| 5,713,574 | A | 2/1998 | Hughes | |
| 5,836,818 | A | 11/1998 | Jones | |
| 5,851,011 | A | 12/1998 | Lott | |
| 5,851,147 | A | 12/1998 | Stupak | |
| 5,879,233 | A | 3/1999 | Stupero | |
| 5,944,315 | A | 8/1999 | Mostashari | |
| 5,964,464 | A | 10/1999 | Jones | |
| 6,004,205 | A | 12/1999 | Lauretta | |
| 6,007,424 | A | 12/1999 | Evers | |
| 6,065,752 | A | 5/2000 | Beltran | |
| 6,105,964 | A | 8/2000 | Maahs | |
| 6,109,612 | A | 8/2000 | Moore | |
| 6,179,293 | B1 | 1/2001 | Hedman | |
| 6,206,374 | B1 | 3/2001 | Jones | |
| 6,227,969 | B1 | 5/2001 | Yoseloff | |
| 6,234,483 | B1 | 5/2001 | Bucan | |
| 6,299,532 | B1 | 10/2001 | Smith | |
| 6,336,859 | B2 | 1/2002 | Jones | |
| 6,461,240 | B1 | 10/2002 | Perkins | |
| 6,485,368 | B2 | 11/2002 | Jones | |
| 6,536,768 | B2 | 3/2003 | Caputo | |
| 6,575,464 | B1 | 6/2003 | Fertitta | |
| 6,656,052 | B2 | 12/2003 | Abramopoulos | |
| 6,722,655 | B1 | 4/2004 | Camero | |
| 6,755,421 | B1 | 6/2004 | Aftergood | |
| 6,869,075 | B1 | 3/2005 | Stavinsky | |
| 7,029,011 | B2 | 4/2006 | Strong | |
| 7,128,645 | B1 | 10/2006 | White | |
| 7,255,644 | B2 | 8/2007 | Duhamel | |
| 7,306,517 | B1 | 12/2007 | Forbes | |
| 7,448,947 | B2 | 11/2008 | Englman | |
| 7,690,976 | B2 | 4/2010 | Edidin | |
| 7,785,183 | B1 | 8/2010 | Stockham | |
| 8,317,584 | B2 | 11/2012 | Aoki | |
| 10,147,271 | B2 | 12/2018 | Chim | |
| 10,657,769 | B2 | 5/2020 | Chim | |
| 11,195,376 | B2 | 12/2021 | Chim | |
| 11,688,240 | B2 * | 6/2023 | Chim | G07F 17/3246 463/13 |
| 2001/0049303 | A1 | 12/2001 | Found | |
| 2002/0034974 | A1 | 3/2002 | Wood | |
| 2002/0103018 | A1 | 8/2002 | Rommerdahl | |
| 2002/0113369 | A1 | 8/2002 | Weingardt | |
| 2002/0187823 | A1 | 12/2002 | Khal | |
| 2002/0190467 | A1 | 12/2002 | Braun | |
| 2002/0190469 | A1 | 12/2002 | Conklin | |
| 2003/0040363 | A1 | 2/2003 | Sandberg | |
| 2003/0114209 | A1 | 6/2003 | Ritner | |
| 2003/0184015 | A1 | 10/2003 | Williams | |
| 2004/0023712 | A1 | 2/2004 | Oliver | |
| 2004/0102234 | A1 | 5/2004 | Gold | |
| 2004/0132524 | A1 | 7/2004 | Ramstad | |
| 2005/0040599 | A1 | 2/2005 | Snow | |
| 2005/0096130 | A1 | 5/2005 | Mullins | |
| 2005/0173863 | A1 | 8/2005 | Walker | |
| 2005/0218591 | A1 | 10/2005 | Torigian | |
| 2006/0025221 | A1 | 2/2006 | Jain | |
| 2006/0068899 | A1 | 3/2006 | White | |
| 2006/0178181 | A1 | 8/2006 | Chun | |
| 2006/0226604 | A1 | 10/2006 | Saucier | |
| 2007/0040332 | A1 | 2/2007 | Noyes | |
| 2007/0045958 | A1 | 3/2007 | Rader | |
| 2007/0060236 | A1 | 3/2007 | Dodge | |
| 2007/0060241 | A1 | 3/2007 | Low | |
| 2007/0135195 | A1 | 6/2007 | Albino | |
| 2007/0257429 | A1 | 11/2007 | Kane | |
| 2007/0270211 | A1 | 11/2007 | Moshal | |
| 2008/0007003 | A1 | 1/2008 | Davis | |
| 2008/0042355 | A1 | 2/2008 | Snow | |
| 2008/0073840 | A1 | 3/2008 | Comeau | |
| 2009/0029766 | A1 | 1/2009 | Lutnick | |
| 2009/0291733 | A1 | 11/2009 | Chim | |
| 2012/0172111 | A1 | 7/2012 | Parham | |

FOREIGN PATENT DOCUMENTS

| | | | |
|---|---|---|---|
| CA | 2559412 | A1 | 3/2007 |
| CA | 2589243 | A1 | 11/2007 |
| EP | 0744786 | A1 | 11/1996 |
| ES | 8501549 | A1 | 12/1984 |
| FR | 2739954 | A1 | 4/1997 |
| GB | 2320664 | A | 6/1998 |
| JP | H11151354 | | 6/1999 |
| WO | 9501212 | A1 | 1/1995 |
| WO | 9521665 | A1 | 8/1995 |
| WO | 9727568 | A1 | 7/1997 |
| WO | 9736658 | A1 | 10/1997 |
| WO | 9811964 | A1 | 3/1998 |
| WO | 9818532 | A1 | 5/1998 |
| WO | 9924947 | A1 | 5/1999 |
| WO | 0200314 | A1 | 1/2002 |
| WO | 0218023 | A1 | 3/2002 |
| WO | 03037534 | A1 | 5/2003 |
| WO | 03067534 | | 8/2003 |
| WO | 2004080551 | A2 | 9/2004 |

OTHER PUBLICATIONS

United States Patent and Trademark Office, "Non-Final Office Action," issued in connection with U.S. Appl. No. 12/468,518, mailed on Sep. 29, 2011, 16 pages.
AU Examination Report in AU Application No. 2009201970, dated Jul. 16, 2010. 2 Pages.
AU Examination Report in AU Application No. 2015238804 dated Sep. 21, 2016. 3 Pages.
AU Examination Report in AU Application No. 2017232105, dated Oct. 12, 2018. 3 Pages.
Office Action dated May 20, 2021 for U.S. Appl. No. 16/866,216 (pp. 1-11).

(56) References Cited

OTHER PUBLICATIONS

Office Action (Notice of Allowance and Fees Due (PTOL-85)) dated Sep. 1, 2021 for U.S. Appl. No. 16/866,216 (pp. 1-6).
Office Action (Non-Final Rejection) dated Aug. 30, 2022 for U.S. Appl. No. 17/534,152 (pp. 1-9).
Office Action (Final Rejection) dated Dec. 29, 2022 for U.S. Appl. No. 17/534,152 (pp. 1-6).
Office Action (Notice of Allowance and Fees Due (PTOL-85)) dated Feb. 15, 2023 for U.S. Appl. No. 17/534,152 (pp. 1-5).

* cited by examiner

GAMING METHOD AND A GAMING SYSTEM

CROSS-REFERENCE TO RELATED APPLICATIONS

The present application claims the benefit and is a continuation of U.S. patent application Ser. No. 17/534,152, filed Nov. 23, 2021, which claims the benefit and is a continuation of U.S. patent application Ser. No. 16/866,216, filed May 4, 2020, now U.S. Pat. No. 11,195,376, which claims the benefit and is a continuation of U.S. patent application Ser. No. 16/195,466, filed Nov. 19, 2018, now U.S. Pat. No. 10,657,769, which claims the benefit and is a continuation of U.S. patent application Ser. No. 15/257,151, filed Sep. 6, 2016, now U.S. Pat. No. 10,147,271, which claims the benefit and is a continuation of U.S. patent application Ser. No. 13/434,201, filed Mar. 29, 2012, now U.S. Pat. No. 9,437,082, which claims the benefit and is a continuation of U.S. patent application Ser. No. 12/468,518, filed May 19, 2009, now abandoned, which claims priority to Australian Provisional Patent Application No. 2008902585, filed on May 23, 2008, all of which are incorporated herein by reference in their entireties.

FIELD

The present invention relates to a method of gaming and a gaming system.

BACKGROUND

Current gaming systems allow a player to place a wager or bet, in return for which a game round of a game is conducted. Many gaming systems implement a jackpot award as an additional feature to the game round played so that the player can be awarded a jackpot based on the result of the game round.

While such gaming systems provide users with enjoyment, a need exists for alternative gaming systems in order to maintain or increase player enjoyment.

SUMMARY

In one aspect, an electronic gaming machine is provided. The electronic gaming machine includes a display device, a player input interface, a credit input mechanism including at least one of a card reader, a ticket reader, a bill validator, or a coin input mechanism, and a game controller. The game controller is configured to select a first plurality of card symbols to form a player hand for a player, wherein the first plurality of card symbols include a plurality of hole cards dealt only to the player and at least one community card. The game controller is also configured to select a second plurality of card symbols to form a jackpot hand, and determine whether at least one card symbol of the first plurality of card symbols forming the player hand matches at least one card symbol of the second plurality of card symbols forming the jackpot hand. In addition, the game controller is configured to adjust, based on the determining, a credit balance of the player by a value associated with a jackpot award based upon a number of hole cards in the player hand that match card symbols in the jackpot hand.

In another aspect, a method for playing a wagering game on an electronic gaming machine is provided. The method includes selecting, by a game controller of an electronic gaming machine, a first plurality of card symbols to form a player hand for a player, wherein the first plurality of card symbols include a plurality of hole cards dealt only to the player and at least one community card. The method also includes selecting, by the game controller, a second plurality of card symbols to form a jackpot hand, and determining, by the game controller, whether at least one card symbol of the first plurality of card symbols forming the player hand matches at least one card symbol of the second plurality of card symbols forming the jackpot hand. In addition, the method includes adjusting, by the game controller and based on the determining, a credit balance of the player by a value associated with a jackpot award based upon a number of hole cards in the player hand that match card symbols in the jackpot hand.

In yet another aspect, an article of manufacture is provided. The article includes a non-transitory, tangible, computer readable storage medium having instructions stored thereon that, when executed by a game controller, cause the game controller to select a first plurality of card symbols to form a player hand for a player, wherein the first plurality of card symbols include a plurality of hole cards dealt only to the player and at least one community card. The instructions may also cause the game controller to select a second plurality of card symbols to form a jackpot hand, and determine whether at least one card symbol of the first plurality of card symbols forming the player hand matches at least one card symbol of the second plurality of card symbols forming the jackpot hand. In addition, the instructions may cause the game controller to adjust, based on the determining, a credit balance of the player by a value associated with a jackpot award based upon a number of hole cards in the player hand that match card symbols in the jackpot hand.

BRIEF DESCRIPTION OF THE DRAWINGS

An exemplary embodiment of the invention will now be described with reference to the accompanying drawings in which.

Figure 1:
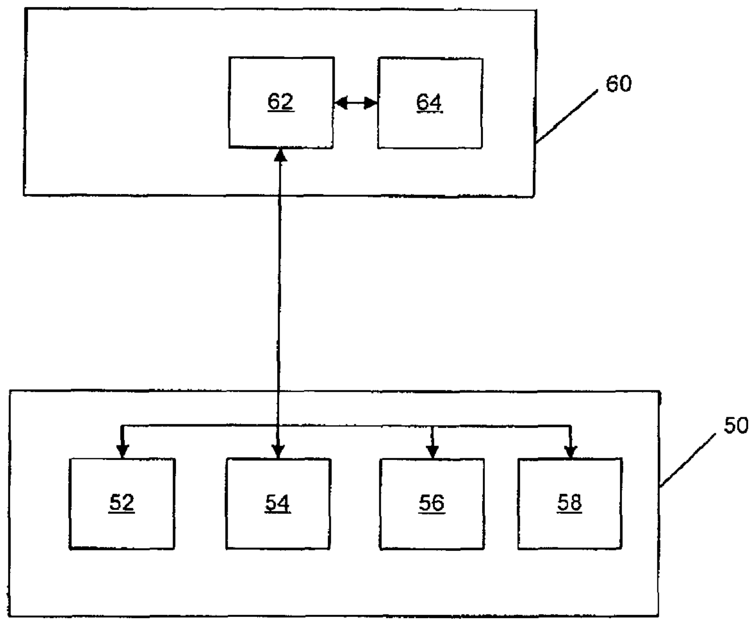
FIG. 1 is a block diagram of the core components of a gaming system.

Features, further aspects, and advantages of the present invention will become apparent from the following description of embodiments thereof, by way of example only, with reference to the accompanying drawings. Also, various embodiments of the aspects described in the preceding paragraphs will be apparent from the appended claims, the following description and/or the accompanying drawings. It should be understood, however, that the present invention is not limited to the arrangements and instrumentality shown in the attached drawings.

DETAILED DESCRIPTION

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements is hereby expressly defined to include a tangible medium such as a memory, DVD, CD, etc. storing the software and/or firmware.

Referring to the drawings, there is shown a method and gaming system having a game controller arranged to implement a game wherein a jackpot award is made to a player with a player hand corresponding to a jackpot hand.

General Construction of Gaming System

The gaming system can take a number of different forms. In a first form, a stand alone gaming machine is provided wherein all or most components implementing the game are present in a player operable gaming machine.

In a second form, a distributed architecture is provided wherein some of the components implementing the game are present in a player operable gaming machine and some of the components implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
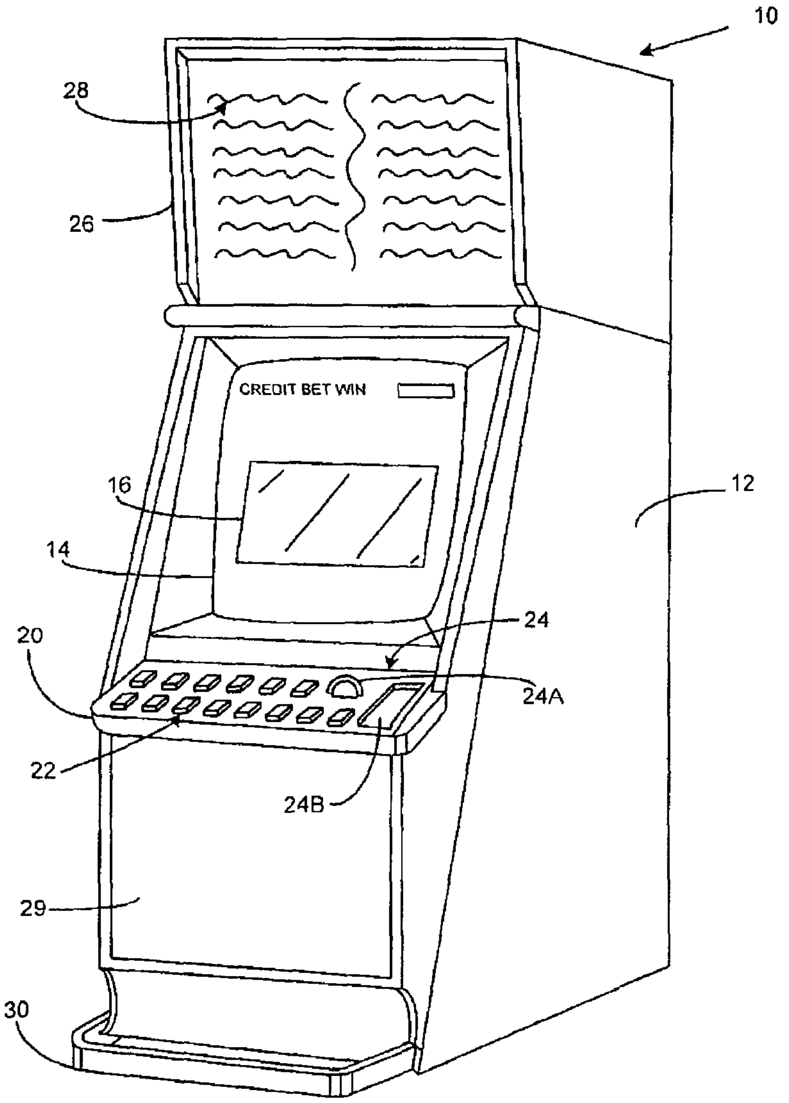
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
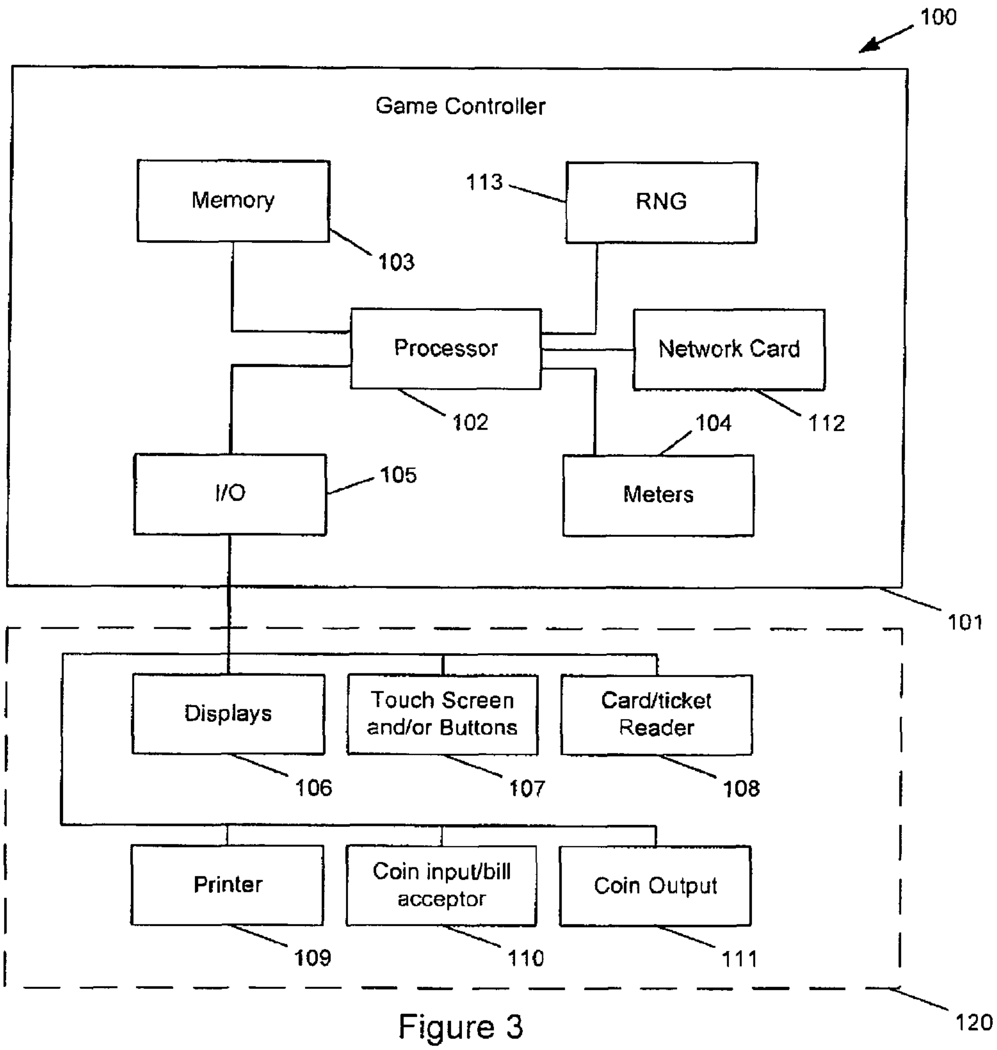
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
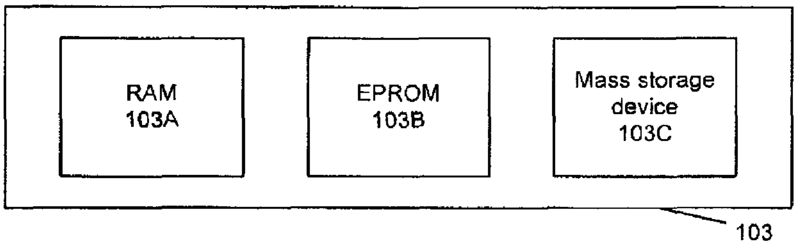
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
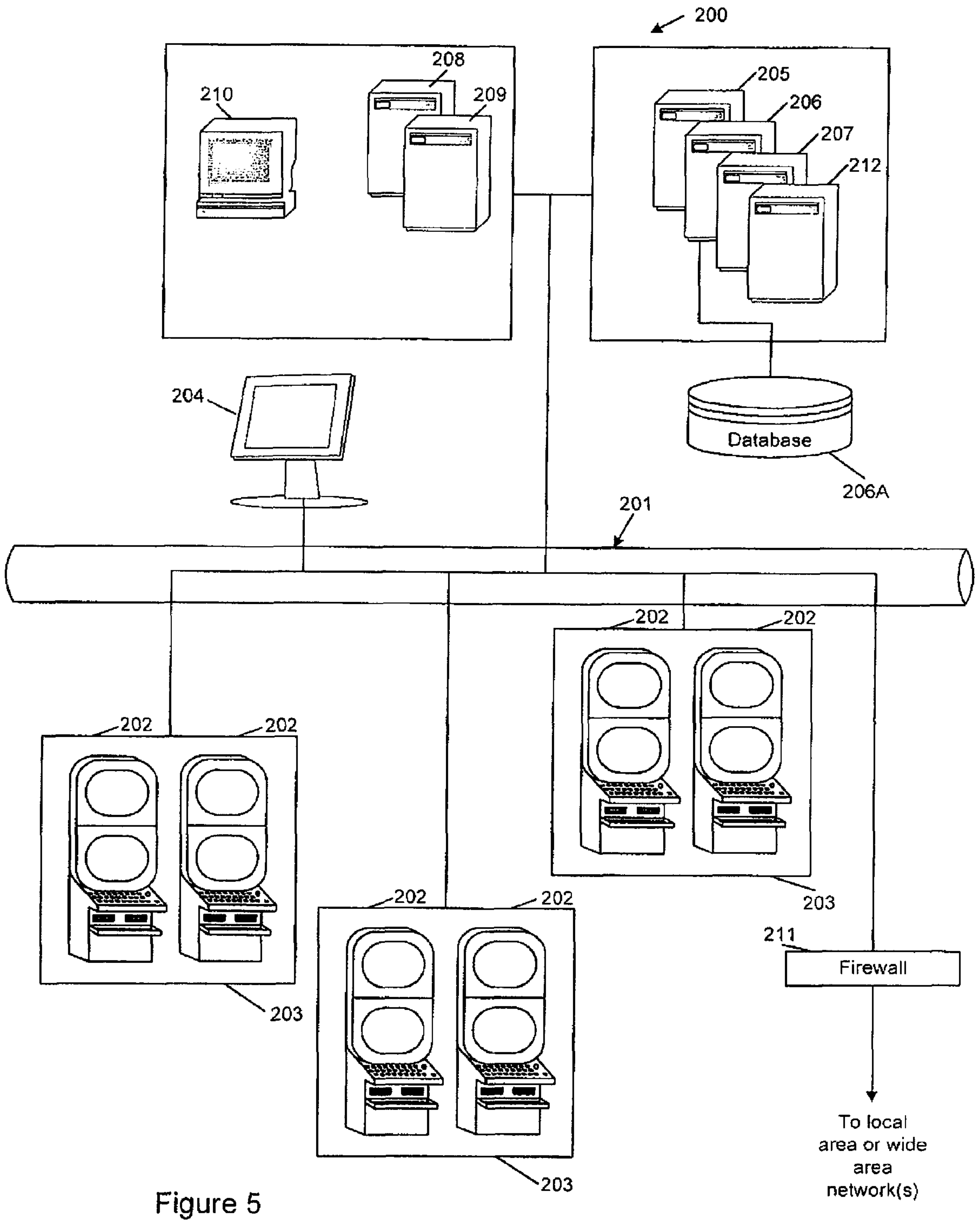
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10, 100 shown in FIGS. 2 and 3, or may have simplified functionality depending on the rules, guidelines, preferences, and/or requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games based on the terminals.

Further Detail of Gaming System

Figure 6:
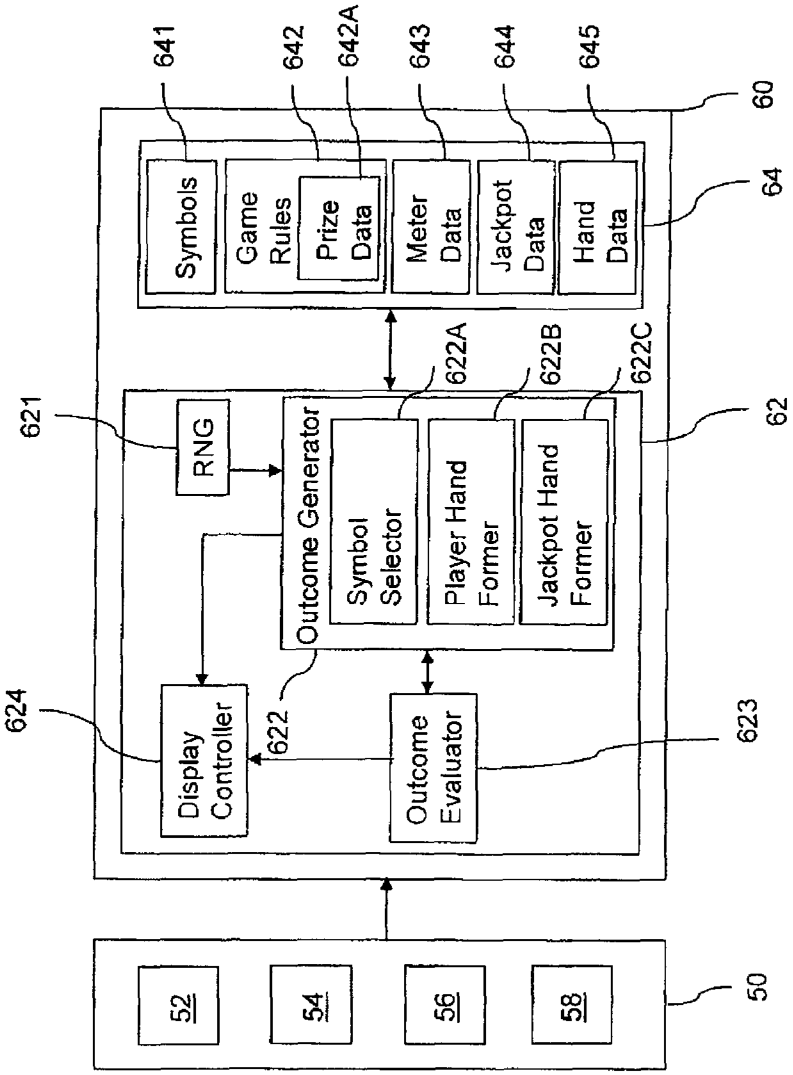
FIG. 6 is a further block diagram of a gaming system.

Referring to FIG. 6, the player operates the game play mechanism 56 to play a game implemented by the gaming system. In one embodiment, the game play mechanism 56 is operated to play a game round of the game. The game played includes a jackpot feature to provide increased levels of player enjoyment. The game may be implemented on a single player system or a multi-player system.

In one embodiment, display 54 displays to a player at least one unique symbol forming a player hand, which is formed from a plurality of symbols. That is, in some embodiments it is possible for there to be more than one of the same symbol forming all or part of the player hand. The display also displays at least one symbol forming a jackpot hand, which is also formed from a plurality of symbols. In an example of the gaming system, both the player and jackpot hands can be formed using repeated symbols. For example, if two sets of the same set of symbols are used to form a jackpot and a player hand, it is possible that the jackpot or player hand is formed with two identical symbols. In a further example of the gaming system, both the player and jackpot hands have a total of five symbols.

Exemplary embodiments of the present invention relate to gaming systems where the game is a game of poker and the symbols include playing card symbols. For example, in a game round of poker, the usual rules of poker are applied and there are 52 playing card symbols from which the player and jackpot hands are selected. In one embodiment, the player and jackpot hands are selected from two sets of the same 52 playing card symbols. Other embodiments are envisaged where, for example, multiple sets, or decks, of the 52 playing card symbols are used to form either the player or jackpot hands. Also, the set of symbols need not be limited to a traditional 52 playing card deck. Other embodiments utilising a different number of symbols are envisaged including the use of wild cards or jokers in addition to the 52 card deck and the removal of cards from the 52 card deck, such as the removal of the 'ten' cards in the game of pontoon.

The game controller 60 is shown in further detail in FIG. 6 and incorporates a processor 62 and memory 64. The processor implements a number of modules including a random number generator 621, an outcome generator 622, an outcome evaluator 623 and a display controller 624. The memory 64 includes a set of symbols 641 selected to form player and jackpot hands and, in the above described embodiment, the symbols 641 are a set of 52 playing card symbols. Also included in the memory 64 are the game rules 642, for example the game rules for a game of poker, the game round prize data 642A, meter data 643, jackpot data 644 and hand data 645. Persons skilled in the art will appreciate that one or more of these modules could be provided in other ways, for example by a dedicated circuit.

In one embodiment, the outcome generator 622 includes a player hand former 622B and a jackpot hand former 622C, each of which employs a symbol selector 622A to select a number of symbols specified by the game rules 642 from the set of symbols 641. The symbol selector 622A employs the random number generator 621 to randomly select symbols from the set 641 to form the player hand and the jackpot hand. The formed hands are stored as hand data 645. For example, in one variation of the game of poker, the symbol selector selects symbols from the set of 52 playing card symbols to form a player hand including 5 cards. The symbol selector also selects symbols from another set of 52 playing card symbols to form a jackpot hand including 5 cards. The jackpot hand can be formed from a different set of 52 cards for each player in a multi-player embodiment. The symbol selector 622A selects symbols from the symbol set 641 for display to the player on the display 54, at a set of display positions, via the display controller 624.

In one embodiment, the outcome evaluator 623 evaluates the symbols selected by the symbol selector 622A to form the player and jackpot hands and determines whether to make a jackpot award to the player of the player hand corresponding to the jackpot hand. In a multi-player example, each player has a unique jackpot hand selected by the symbol selector 622A and displayed only to the player. Alternatively, a common jackpot hand is used but is only visible to an individual player and is displayed on each player's display 54. The common jackpot hand is used to determine whether to make a jackpot award to the player hand corresponding to the jackpot hand.

The outcome evaluator 623 also evaluates the player hand against other player hands in the multi-player embodiment or a simulated opponent hand or pay table in the case of a single player embodiment, according to the game rules 642. For example, for the game of poker, the player is awarded a win, and a prize, if the player hand is ranked the highest according to a predetermined set of game rules 642 and the win or prize value corresponds to the amount bet by the or each player. In one embodiment, prize data 642A contains a set of predetermined prizes to be awarded according to the combination of symbols forming the player hand. A person skilled in the art would appreciate that either one or both of these methods of awarding a prize may be performed by the outcome evaluator 623 in a game. The outcome evaluator 623 also updates meter data 643 and displays the prize on display 54 on the player interface 50.

The amount bet, or wagered, is initially inputted by the player via the credit mechanism 52 and, in the game of poker, the player can continue to wager throughout the game round in accordance with the rules. In one embodiment, the player inputs a jackpot wager and a game round wager. A jackpot game is then conducted by the outcome evaluator 623 in response to the jackpot wager. An alternative example is envisaged where the jackpot game is conducted by the outcome evaluator 623 in response to a percentage of the game round wager. Also, in a further example, the jackpot wager and a percentage of the game round wager contribute to a progressive jackpot. The outcome evaluator 623 updates jackpot data 644 which contains the current value of the jackpot award to be made.

In one embodiment, the jackpot award is made to all players with a player hand corresponding to the jackpot hand. However, in a further embodiment, if more than one player has a player hand corresponding to the jackpot hand, the outcome evaluator 623 can be arranged to determine whether to make the jackpot award to only one player. An example of one method of achieving this is for the symbol selector 622A to select cards randomly using the random number generator 621 for each player and the player's card, or cards, with the highest rank according to the rules of poker is the winner.

Figure 7:
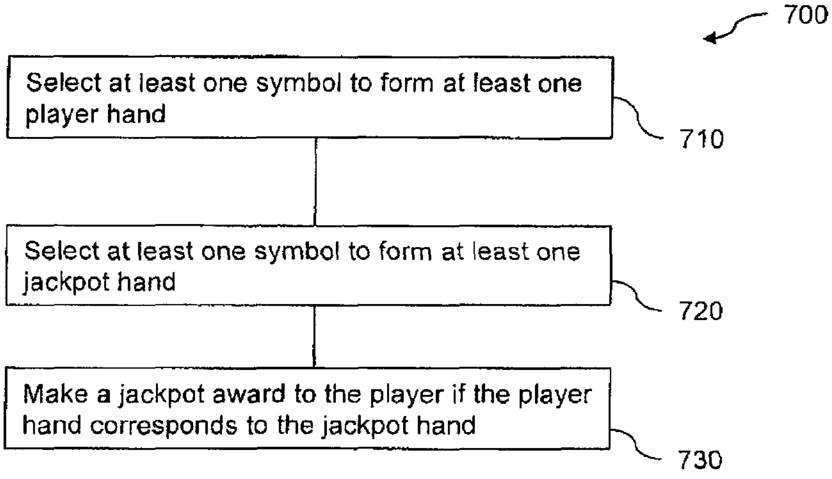
FIG. 7 is a flow chart of an embodiment.

A method of gaming 700 is summarised in FIG. 7 and involves selecting 710 at least one symbol to form at least one player hand including a plurality of symbols, selecting 720 at least one symbol to form a jackpot hand also including a plurality of symbols, and making 730 a jackpot award to the player if the player hand corresponds to the jackpot hand.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

Figure 8:
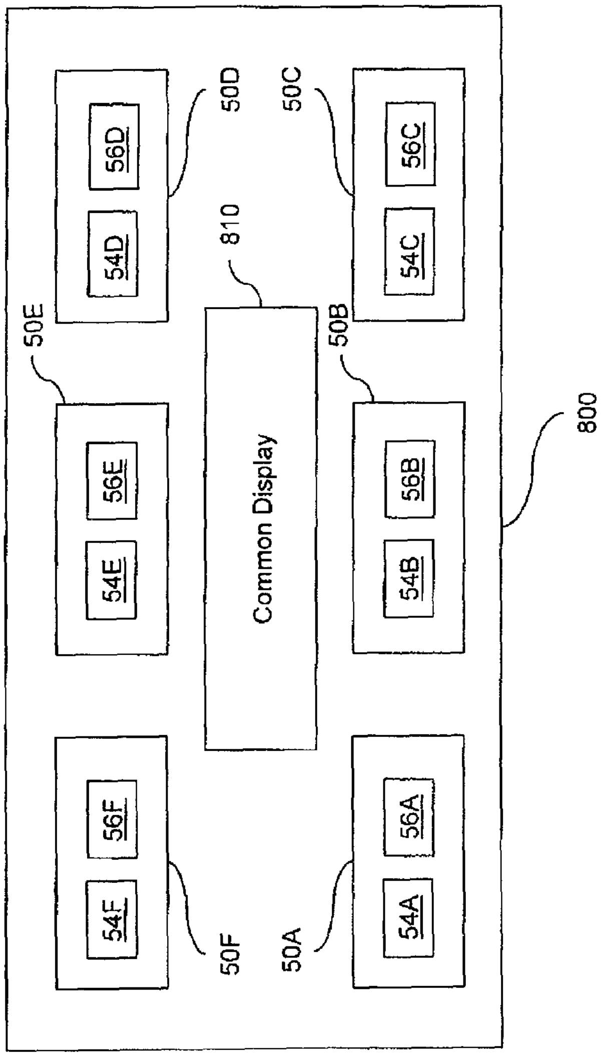
FIG. 8 is a block diagram of an embodiment.

FIG. 8 shows a multi-player embodiment of a gaming system implementing a game. A gaming table 800 is arranged to include a number of gaming systems to enable a number of players to place a wager or bet in return for a game round of the game. In the illustrated embodiment, each player has a player interface, 50A, 50B, 50C, 50D, 50E and 50F, to enable the player to interact with the gaming system. For this purpose, each player interface has a display, 54A, 54B, 54C, 54D, 54E and 54F, and a game play mechanism 56A, 56B, 56C, 56D, 56E and 56F, to play the game. In one embodiment, each player is situated around a physical table and physically dealt a player hand and a jackpot hand displayed only to the respective players.

Each display 54A, 54B, 54C, 54D, 54E and 54F shown in FIG. 8 enables a selected player hand and a jackpot hand to be displayed to each respective player. For example, for a player using player interface 50A to play a game round of poker, a jackpot hand is selected and displayed to the player on display 54A, which is unique to the player. The player can then operate the game play mechanism 56A to form a player hand by combining cards displayed on the display 54A. The player can combine cards and place wagers depending on their perceived likelihood of forming the highest ranked combination of cards according to the game rules of poker. The player can also combine cards to form a player hand corresponding to the displayed unique jackpot hand to receive a jackpot award.

In one embodiment, the common display 810 displays information public to each player, and any observer, such as community cards, the amount of credit each player has left, the last winner of a game round and the amount of the win, the last winner of the jackpot and the amount of the jackpot award, and the current size of the jackpot.

A particular advantage of this embodiment is that because each player has their own jackpot hand, the triggering of a jackpot prize will not reveal anything about a player's hand to other players.

Persons skilled in the art will appreciate that other game rules of poker may be used to implement the above described gaming system. In such embodiments player hand former 622B may be arranged to allow a player to re-form their hand in accordance with game rules which allow a player to discard and re-draw cards.

Example 1

In an example of a game to which the invention is applied, the symbol selector 622A selects two cards to be player hole cards and five cards to be community cards for display to the player. The player hand is formed, using the player hand former 622B, by combining at least one hole card and a number of community cards, for example to select the highest ranked hand. The jackpot hand former 622C employs the symbol selector 622A to select cards to form the jackpot hand. The player may operate the game play mechanism 56 to select the displayed cards using at least one of the hole cards and a number of the community cards to form the highest ranked combination of cards according to the game rules 642 or to form the jackpot hand. For example, the player operates the game play mechanism 56 to select two hole cards and three community cards from the displayed cards. The outcome evaluator 623 is arranged to evaluate the player hand against either a simulated opponent hand, or pay table, in a single player embodiment or against other player hands in a multi-player embodiment, to evaluate whether the combination of cards is ranked the highest.

The outcome evaluator 623 also evaluates the player hand against the jackpot hand to determine whether to make the jackpot award. The outcome evaluator 623 makes a larger portion of the jackpot award to the player hand corresponding to the jackpot hand formed with two hole cards than to the player hand corresponding to the jackpot hand formed with only one hole card. For example, if all five jackpot cards correspond to the five player cards formed with two hole cards and three community cards, a major jackpot award is made. If four of the five jackpot cards correspond to four of the five player cards formed with two hole cards and two community cards, a minor jackpot award is made. If four of the five jackpot cards correspond to four of the five player cards formed with one hole card and three community cards, a mini jackpot award is made. In the example, the game is multi-player Texas Hold'Em including a game round and a jackpot game.

In the example, the rules of the game round of Texas Hold'Em game specify that:

1. Players can bet from 1 to 100 credits per wager.
2. Maximum of 10 players per game.
3. Cards for the main game round are randomly selected from a 52 card deck.
4. Players place a wager then two hole cards are dealt to each player. The hole cards are only displayed to the player.
5. Players can place a further wager then three community cards are dealt and displayed to all players.
6. Players can place a further wager then one additional community card is dealt and displayed to all players.
7. A percentage of all moneys bet is put to the jackpot.

In the example, the rules of the jackpot game specify that:

1. Eligibility for the jackpot requires the player to wager a minimum of 5 credits on a game round.
2. The price for the jackpot wager is 5 credits.
3. The jackpot wager is placed at the commencement of the game.
4. When the game is commenced, a jackpot hand is selected for each player.
5. The jackpot hand is dealt randomly from a 52 card deck, separate to the deck used for the game round.
6. The jackpot hand can be unique to each player and drawn from one deck.
7. A jackpot award is made if the player's two hole cards and three of the community cards match the jackpot hand dealt to the player.

An example of the above game being played is as follows:

1. The player places a 5 credit wager for the game and a 5 credit wager for the jackpot (total wager=10 credits). A percentage of the wager is put into the jackpot.
2. The game round of poker commences.
3. From a 52 card game deck, the symbol selector 622A randomly selects hole cards for all players. The hole cards are displayed on the display 54 by the display controller 624.
4. From a separate 52 card jackpot deck, five random cards are selected by the symbol selector 622A and displayed on each separate display 54 by the display controller 624 for each player.
5. The player places a second wager of 10 credits and a percentage of the wager is put into the jackpot.
6. From the remaining cards in the main game deck, three community cards are dealt and displayed to all players.
7. The player places a third wager of 2 credits. A percentage of the wager is put into the jackpot.
8. From the original deck, one community card is displayed to all players.
9. The player places a fourth wager of 10 credits. A percentage of the wager is put into the jackpot.
10. From the original deck, one community card is dealt and displayed to all players.
11. The cards are evaluated by the outcome evaluator 623 for the main game.
12. The cards are evaluated by the outcome evaluator 623 for the jackpot game.
13. The jackpot award is made to the player with the corresponding jackpot hand.

It will be understood to persons skilled in the art of the invention that many modifications may be made without departing from the spirit and scope of the invention, in particular it will be apparent that certain features of the invention can be combined to form further embodiments.

It is to be understood that, the reference to prior art herein does not constitute an admission that the prior art forms a part of the common general knowledge in any country.

In the claims which follow and in the preceding description of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. An electronic gaming device comprising:

at least one display device;

at least one memory with instructions stored thereon; and at least one processor in communication with the at least one memory, wherein the instructions, when executed by the at least one processor, cause the at least one processor to:

display, at the at least one display device, a first plurality of card symbols for an electronic game on the at least one display device, the electronic game played by a plurality of player accounts, the first plurality of card symbols generated by a symbol selector component based upon a first output from a random number generator (RNG) component and a player hand former component of an outcome generator computer module, the first plurality of card symbols comprising a plurality of player cards associated with a player account of the plurality of player accounts and at least one community card of a plurality of community cards;

store hand data in the at least one memory, the hand data associated with the first plurality of card symbols;

display, at the at least one display device and not at one or more display devices associated with one or more player accounts of the plurality of player accounts different from the player account, a second plurality of card symbols for the electronic game on the at least one display device, the second plurality of card symbols generated by the symbol selector component based upon a second output from the RNG component and a jackpot hand former component of the outcome generator computer module, the second plurality of card symbols comprising a jackpot hand associated with the player account;

store jackpot hand data in the at least one memory, the jackpot hand data associated with the second plurality of card symbols;

cause a value associated with an output for the electronic game to increase by a first amount based on an outcome output from the outcome generator computer module, the outcome output comprising a number of the plurality of player cards stored in the hand data in the at least one memory that match at least one card symbol stored in the jackpot hand data, the value stored in the at least one memory as jackpot data;

cause the value associated with the output for the electronic game to increase by a second amount based on the outcome output from the outcome generator computer module, the outcome output further comprising a number of community cards that match at least one card symbol in the jackpot hand stored in the hand data in the at least one memory, wherein the first amount is different from the second amount; and cause a balance associated with the player account to increase by the value associated with the output to an increased balance based on the outcome output from the outcome generator computer module.

2. The electronic gaming device of claim 1, wherein the instructions further cause the at least one processor to display the first plurality of card symbols based on at least one message received from a gaming server.

3. The electronic gaming device of claim 1, wherein the instructions further cause the at least one processor to display the second plurality of card symbols based on at least one message received from a gaming server.

4. The electronic gaming device of claim 1, wherein the instructions further cause the at least one processor to:

display the balance; and update display of the balance to the increased balance upon causing the balance to increase by the value associated with the output to the increased balance.

5. The electronic gaming device of claim 1, wherein the instructions further cause the at least one processor to:

receive an input amount associated with the electronic game; and cause a jackpot value associated with the jackpot hand to be increased based on the input amount.

6. The electronic gaming device of claim 5, wherein the instructions further cause the at least one processor to cause the jackpot value to be increased by transmitting at least one message associated with the input amount to a gaming server.

7. An electronic gaming system comprising:

at least one memory with instructions stored thereon; and at least one processor in communication with the at least one memory, wherein the instructions, when executed by the at least one processor, cause the at least one processor to:

cause a first plurality of card symbols for an electronic game to be displayed on a display device, the electronic game played by a plurality of player accounts, the first plurality of card symbols generated by a symbol selector component based upon a first output from a random number generator (RNG) component and a player hand former component of an outcome generator computer module, the first plurality of card symbols comprising a plurality of player cards associated with a player account of the plurality of player accounts and at least one community card of a plurality of community cards;

cause hand data to be stored in the at least one memory, the hand data associated with the first plurality of card symbols;

cause a second plurality of card symbols for the electronic game to be displayed on the display device and not to be displayed on one or more display devices associated with one or more player accounts of the plurality of player accounts different from the player account, the second plurality of card symbols generated by the symbol selector component based upon a second output from the RNG component and a jackpot hand former component of the outcome generator computer module, the second plurality of card symbols comprising a jackpot hand associated with the player account;

cause jackpot hand data to be stored in the at least one memory, the jackpot hand data associated with the second plurality of card symbols;

cause a value associated with an output for the electronic game to increase by a first amount based on an outcome output from the outcome generator computer module, the outcome output comprising a number of the plurality of player cards stored in the hand data in the at least one memory that match at least one card symbol stored in the jackpot hand data, the value stored in the at least one memory as jackpot data;

cause the value associated with the output for the electronic game to increase by a second amount based on the outcome output from the outcome generator computer module, the outcome output further comprising a number of community cards that match at least one card symbol in the jackpot hand stored in the hand data in the at least one memory, wherein the first amount is different from the second amount; and cause a balance associated with the player account to increase by the value associated with the output to an increased balance based on the outcome output from the outcome generator computer module.

8. The electronic gaming system of claim 7, wherein the instructions further cause the at least one processor to cause the first plurality of card symbols to be displayed by transmitting at least one message to an electronic gaming device, wherein the electronic gaming device displays the first plurality of card symbols.

9. The electronic gaming system of claim 7, wherein the instructions further cause the at least one processor to cause the second plurality of card symbols to be displayed by transmitting at least one message to an electronic gaming device, wherein the electronic gaming device displays the first plurality of card symbols.

10. The electronic gaming system of claim 7, wherein the instructions further cause the at least one processor to cause the balance to increase by transmitting at least one message to an electronic gaming device, wherein the electronic gaming device displays the first plurality of card symbols.

11. The electronic gaming system of claim 7, wherein the instructions further cause the at least one processor to:

receive an input amount associated with the electronic game; and cause a jackpot value associated with the jackpot hand to be increased based on the input amount.

12. The electronic gaming system of claim 11, wherein the instructions further cause the at least one processor to receive the input amount from an electronic gaming device where the electronic game is being displayed.

13. At least one non-transitory computer-readable storage medium with instructions stored thereon that, in response to execution by at least one processor, cause the at least one processor to:

identify a first plurality of card symbols to be displayed for an electronic game on a display device, the electronic game played by a plurality of player accounts, the first plurality of card symbols generated by a symbol selector component based upon a first output from a random number generator (RNG) component and a player hand former component of an outcome generator computer module, the first plurality of card symbols comprising a plurality of player cards associated with a player account of the plurality of player accounts and at least one community card of a plurality of community cards;

store hand data in the at least one non-transitory computer-readable storage medium, the hand data associated with the first plurality of card symbols;

identify a second plurality of card symbols to be displayed for the electronic game on the display device and not to be displayed on one or more display devices associated with one or more player accounts of the plurality of player accounts different from the player account, the second plurality of card symbols generated by the symbol selector component based upon a second output from the RNG component and a jackpot hand former component of the outcome generator computer module, the second plurality of card symbols comprising a jackpot hand associated with the player account;

store jackpot hand data in the at least one non-transitory computer-readable storage medium, the jackpot hand data associated with the second plurality of card symbols;

cause a value associated with an output for the electronic game to increase by a first amount based on an outcome output from the outcome generator computer module, the outcome output comprising a number of the plurality of player cards stored in the hand data in the at least one non-transitory computer-readable storage medium that match at least one card symbol stored in the jackpot hand data, the value stored in the at least one non-transitory computer-readable storage medium as jackpot data;

cause the value associated with the output for the electronic game to increase by a second amount based on the outcome output from the outcome generator computer module, the outcome output further comprising a number of community cards that match at least one card symbol in the jackpot hand stored in the hand data in the at least one non-transitory computer-readable storage medium, wherein the first amount is different from the second amount; and cause a balance associated with the player account to increase by the value associated with the output to an increased balance based on the outcome output from the outcome generator computer module.

14. The at least one non-transitory computer-readable storage medium of claim 13, wherein the instructions further cause the at least one processor to at least one of cause the value to increase by the first amount, cause the value to increase by the second amount, or cause the balance to increase by transmitting at least one message to a gaming device displaying the electronic game.

15. The at least one non-transitory computer-readable storage medium of claim 13, wherein the instructions further cause the at least one processor to cause display of the first plurality of card symbols by transmitting at least one message to a gaming device displaying the electronic game.

16. The at least one non-transitory computer-readable storage medium of claim 13, wherein the instructions further cause the at least one processor to cause display of the second plurality of card symbols by transmitting at least one message to a gaming device displaying the electronic game.

17. The at least one non-transitory computer-readable storage medium of claim 13, wherein the instructions further cause the at least one processor to:

receive an input amount for the electronic game from a gaming device associated with the electronic game; and cause a jackpot value associated with the jackpot hand to be increased based on the input amount.

* * * * *